United States Patent Office 3,099,170
Patented July 30, 1963

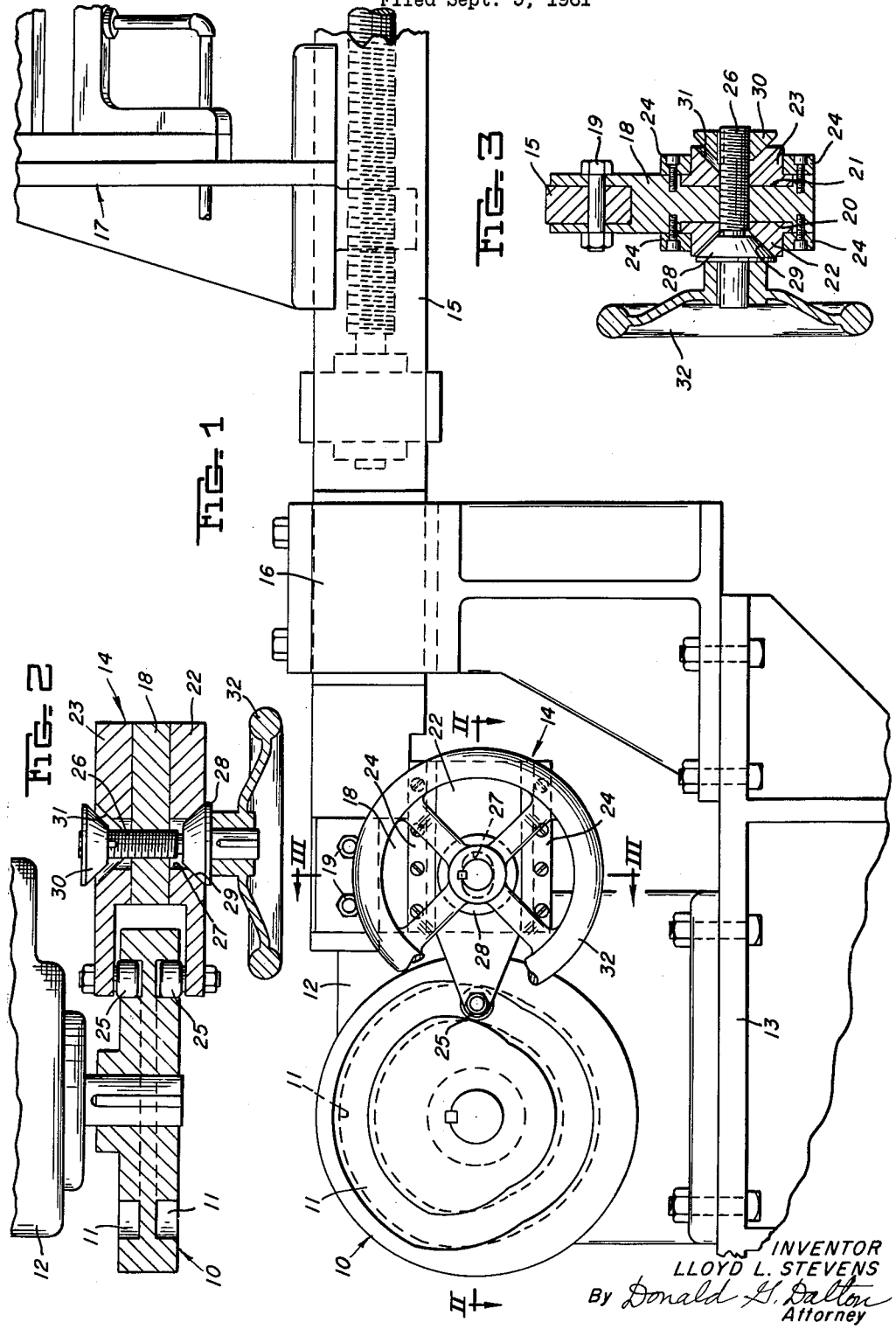

3,099,170
CAM-FOLLOWER SELECTOR DEVICE
Lloyd L. Stevens, Concord, Calif., assignor to United States Steel Corporation, a corporation of New Jersey
Filed Sept. 5, 1961, Ser. No. 136,066
4 Claims. (Cl. 74—569)

This invention relates to a device for selecting one of two followers engaged in cam grooves in opposite faces of a disc, for actuating a mechanical movement.

In the coiling of metal strip, it is desirable to employ what is called stagger winding. To this end, the coiler is continuously reciprocated axially through a small distance during coiling to prevent excessive build-up in the radial thickness of the coil as a result of repeating irregularities across the width of the strip. For this purpose, apparatus is available commercially including a cam actuating the pneumatic sensing head of a strip-edge scanner which, in turn, controls power means for shifting the coiler which is mounted for limited axial sliding movement. Under present conditions, the coiling equipment must be shut down if it is desired to change the throw or degree of reciprocation, by changing from one cam to another. The manufacture of metal strip such as tin plate, however, is necessarily continuous so any shut down is a serious matter.

I have invented a cam-follower selector device making it possible to shift the effective drive from a cam groove in one side of a disc to a similar groove of different shape or throw in the other side, to control a mechanical movement such as that of the sensing head used in stagger winding, without stopping the coiler. In a preferred embodiment, I provide a block disposed in the plane of the disc and connected to the reciprocable beam on which the sensing head is mounted. The block has ways in opposite sides adapted to receive cam-follower slides for reciprocation therein. Each slide has a roller thereon cooperating with a groove in one side of a cam disc. A manually operable screw shaft extending through the block has cones thereon engageable with the slides selectively to grip them frictionally to the block. Thus one cam groove follower or the other may be rendered effective to reciprocate a beam and the degree of reciprocation or throw changed from one value to another without stopping the coiler.

A complete understanding of the invention may be obtained from the following detailed description and explanation which refer to the accompanying drawings illustrating the present preferred embodiment. In the drawings:

FIGURE 1 is an elevation showing the cam-actuated sliding beam supporting the sensing head, with the device of my invention incorporated therein; and FIGURES 2 and 3 are sections therethrough taken, respectively on the planes of lines II—II and III—III of FIGURE 1.

Referring now in detail to the drawings and, for the present to FIGURE 1, particularly, a disc cam 10 having grooves 11 of different shapes in its opposite faces is mounted on the output shaft of a gear reducer 12 carried on a machine base 13. The reducer is driven by any convenient means (not shown). Cam 10, through the device of my invention indicated generally at 14, continuously reciprocates a cantilever beam 15 slidable in a bearing 16 mounted on base 13. A pneumatic sensing head 17 of a strip-edge scanner is mounted on beam 15 and, together with valves and a hydraulic cylinder not shown, operates as a servo-mechanism to shift a strip coiler axially in exact accord with the movement of the head. The apparatus described so far is known except for device 14.

Referring now to FIGURES 1-3, a block 18 is slotted to receive the end of beam 15 extending through bearing 16 and is secured in depending relation thereto by bolts 19. The depending portion of the block is disposed adjacent the edge of cam 10 and has ways 20 and 21 in opposite sides thereof. Cam-follower slides 22 and 23 are reciprocably held in said ways by gibs 24. Each slide has a roller 25 journaled at the end thereof remote from bearing 16. The roller on each slide fits in one of the grooves 11 in opposite faces of disc 10, as shown in FIGURE 2. The grooves are designed to effect throws of, say ½″ and 1″, respectively.

A selector screw 26 is threaded into a tapped hole through block 18 and extends through slots 27 in slides 22 and 23. A conical frustum 28 integral with the screw is adapted to engage a correspondingly shaped seat 29 on slide 22. A similar frustum 30 is keyed to the other end of the screw and is adapted to engage seat 31. Only one frustum, of course, will engage its seat at any one time, depending on whether screw 26 is turned all the way in or out. A hand wheel 32 is keyed to the screw to facilitate manual operation thereof.

It will be evident that, with the screw turned in as shown in FIGURES 2 and 3, cone 28 will cause slide 22 frictionally to grip block 18. Therefore the movement of block 18 and beam 15 will be controlled by the groove 11 shown in solid lines in FIGURE 1. On the other hand, when the screw is turned out so that cone 30 causes slide 23 to grip block 18, the movement of the latter will be controlled by the groove 11 shown in dotted lines in FIGURE 1. The slide not frictionally gripped to the block remains loose for free sliding movement thereon. In operation, either one cam groove or the other will usually be effective and the change from one to the other may be made without stopping the coiler, but straight coiling will occur while both slides are free. If steady straight coiling is desired, it may, of course, be obtained by turning the screw to an intermediate position where neither slide is frictionally gripped to block 18.

The selector of my invention has further advantages of simplicity in structure, ease and positiveness of operation and freedom from maintenance.

Although I have disclosed herein the preferred embodiment of my invention, I intend to cover as well any change or modification therein which may be made without departing from the spirit and scope of the invention.

I claim:

1. Apparatus for selectively rendering effective one of two cam followers engaging respectively two cam grooves of different shapes in opposite faces of a disc, said apparatus comprising a block having ways in opposite faces thereof, said block being disposed adjacent the edge of said disc, a slide reciprocable in each way, each slide having a follower roller thereon cooperating with one of said grooves, and means for selectively clamping one of said slides to said block frictionally and releasing the other for free idling reciprocation in its ways.

2. Apparatus as defined in claim 1, characterized by said means being a screw threaded through said block having abutments thereon engageable selectively with said slides, depending on whether the screw is turned to one extreme position or the other.

3. Apparatus as defined in claim 2, characterized by said abutments being conical frusta and said slides having frusto-conical seats adapted to be engaged thereby.

4. Apparatus as defined in claim 2, characterized by manual operating means secured to said screw.

References Cited in the file of this patent
UNITED STATES PATENTS 780,130    Salzer et al. _____ Jan. 17, 1905
2,747,417  Brown _____ May 29, 1956